(12) United States Patent
Jones (10) Patent No.: US 10,252,445 B2
(45) Date of Patent: Apr. 9, 2019

(54) MANIFOLD ASSEMBLY FOR RESIN INFUSION AND INJECTION

(71) Applicant: Charles Allan Jones, Centennial, CO (US)

(72) Inventor: Charles Allan Jones, Centennial, CO (US)

(73) Assignee: Charles Allan Jones, Centennial, CO (US)

( * ) Notice: Subject to any disclaimer, the term of this patent is extended or adjusted under 35 U.S.C. 154(b) by 0 days.

(21) Appl. No.: 15/632,062

(22) Filed: Jun. 23, 2017

(65) Prior Publication Data

US 2017/0368719 A1  Dec. 28, 2017

Related U.S. Application Data

(60) Provisional application No. 62/354,472, filed on Jun. 24, 2016.

(51) Int. Cl.
| | |
|---|---|
| *B29C 31/04* | (2006.01) |
| *B29C 70/44* | (2006.01) |
| *B29C 70/54* | (2006.01) |
| *B65B 1/04* | (2006.01) |
| *B29C 45/27* | (2006.01) |

(52) U.S. Cl.
CPC ............ *B29C 31/04* (2013.01); *B29C 70/443* (2013.01); *B29C 70/54* (2013.01); *B29C 45/2725* (2013.01); *B65B 1/04* (2013.01)

(58) Field of Classification Search
CPC ....... B29C 31/04; B29C 70/443; B29C 70/54; B29C 45/2725; B65B 1/04
See application file for complete search history.

(56) References Cited

U.S. PATENT DOCUMENTS

| | | | | |
|---|---|---|---|---|
| 3,643,689 | A * | 2/1972 | Isreeli | F15C 1/005 137/561 A |
| 3,997,080 | A * | 12/1976 | Langstroth | A45D 27/10 222/135 |
| 4,639,155 | A * | 1/1987 | Schuster | B05C 17/00546 222/146.1 |
| 4,659,016 | A * | 4/1987 | Faulkner, III | B05C 5/001 118/411 |
| 4,682,711 | A * | 7/1987 | Reighard | B05C 17/002 222/135 |
| 4,913,183 | A * | 4/1990 | Vogel | B29C 65/08 137/15.08 |
| 4,964,795 | A * | 10/1990 | Tooman | B29C 45/2725 264/328.15 |
| 5,125,431 | A * | 6/1992 | Vogel | B29C 65/08 137/561 A |
| 5,188,259 | A * | 2/1993 | Petit | B05C 17/002 222/146.5 |

(Continued)

OTHER PUBLICATIONS

Extended European Search Report for European Patent Application No. 18177949.7, dated Nov. 21, 2018, 9 pages.

*Primary Examiner* — Frederick C Nicolas
(74) *Attorney, Agent, or Firm* — Sheridan Ross PC (57) ABSTRACT

A manifold for resin application, infusion, and/or injection is provided. The manifold comprises at least one inlet and a plurality of outlets. At least one outlet of the manifold comprises a valve that is operable to selectively dispense or terminate a flow of a resin from the outlet, and wherein the resin is supplied through the at least one inlet.

13 Claims, 6 Drawing Sheets

(56) References Cited

U.S. PATENT DOCUMENTS

| | | | | |
|---|---|---|---|---|
| 5,474,102 | A | * | 12/1995 | Lopez ..................... F16L 41/03 137/271 |
| 5,551,603 | A | * | 9/1996 | Woodruff ............ B05B 11/0048 222/325 |
| 6,085,586 | A | * | 7/2000 | Arvidson ................. A62C 5/02 169/16 |
| 6,216,752 | B1 | | 4/2001 | Bailey |
| 6,883,684 | B2 | * | 4/2005 | Jeter ................... B05C 11/1042 222/146.2 |
| 7,694,854 | B2 | * | 4/2010 | Jeter ................... B05C 11/1042 137/561 A |
| 8,985,402 | B2 | * | 3/2015 | Schneider .............. B65D 47/06 222/330 |
| 2004/0084486 | A1 | * | 5/2004 | Raterman ............... B05C 11/10 222/529 |
| 2005/0199293 | A1 | | 9/2005 | Fulcher et al. |
| 2008/0230132 | A1 | * | 9/2008 | Cowan ................... F16K 19/00 137/872 |
| 2008/0276998 | A1 | * | 11/2008 | Boyher .................. E03C 1/023 137/561 A |

\* cited by examiner

MANIFOLD ASSEMBLY FOR RESIN INFUSION AND INJECTION

This U.S. Non-Provisional Patent Application claims the benefit of priority from U.S. Provisional Patent Application Ser. No. 62/354,472, filed Jun. 24, 2016, the entire disclosure of which is hereby incorporated by reference in its entirety.

FIELD

The present disclosure generally relates to methods and devices for injection of resins and similar materials. More specifically, the present disclosure relates to a system comprising a manifold for injecting and controlling the injection of resins. Systems of the present disclosure comprise a plurality of flow ports for the controlled application and dispensation of a resin or similar material into a mold, a structure, a part, or a similar item.

BACKGROUND

Vacuum assisted resin transfer molding (VARTM) and related processes and techniques have been widely used to fabricate relatively large fiber-reinforced composite articles. Such articles include articles of various sizes including turbine blades, ship hulls, etc.

U.S. Pat. No. 6,216,752 to Bailey, which is hereby incorporated by reference in its entirety, discloses a gravity feed resin distribution system. Proper application of resin is important for avoidance of structural weaknesses and deficiencies of the resultant article. Bailey, however, fails to disclose various novel features of the present disclosure, as shown and described herein.

SUMMARY

There exists a long-felt and unmet need in the art for an improved device for enhancing and simplifying resin distribution in comparison to the prior art. In various embodiments of the present disclosure, manifold assemblies, devices, and methods of use thereof for resin infusion processes and similar operations are provided. In certain embodiments, valve-controlled pipe manifold assemblies are provided. The valve-controlled pipe manifold assemblies of the present disclosure preferably comprise a plurality of outlet ports that lead to varying lengths of hose to ensure even coverage and cure of the resin over the required surface.

In certain embodiments of the present disclosure, a resin infusion and/or application process is contemplated. The resin infusion process contemplates "pulling" at least one resin through a system or product by using a negative pressure differential (i.e. vacuum). An internal pressure within an assembly or manifold may range from 3 to 10 mbars (mbar=one thousandth of a bar, the centimeter—gram—second system unit of atmospheric pressure equivalent to 100 Pascal's.)

It will be expressly recognized that the present disclosure is not limited to any particular resin, or the use of any particular resin. In various embodiments, however, it is contemplated that a resin is applied at an approximate temperature of between approximately 30° Celsius and approximately 50° Celsius, and preferably at about 39° Celsius (102° Fahrenheit) during an infusion process.

In preferred embodiments, a pipe manifold for resin application and infusion processes is provided. The pipe manifold preferably comprises stock aluminum, but may comprise various other materials, materials and combinations thereof. Pipe manifolds of the present disclosure may comprise various dimensions, sizes, and proportions based on a desired application. In certain embodiments, however, it is contemplated that a manifold is provided comprising an aluminum body portion with a thickness of approximately 1.50 inches and a width of approximately 2.00 inches. Such body portions are contemplated as withstanding the stress (from vacuum pressure, for example) and heat associated with various molding operations while still providing a light-weight and cost-effective component. In various embodiments, manifolds of the present disclosure are contemplated for use as vacuum-assisted devices, wherein resin is moved through the manifold at least in part due a vacuum force at the injection outlets. Various existing technologies generally fail to provide the proper structure, heat resistance, etc. to withstand the demands of such processes and various components and features as shown and described herein are provided as non-obvious solutions to issues associated with prior art devices.

In one embodiment, a pipe manifold is provided comprising one inlet port and a plurality of outlet ports (e.g. 2-6 outlet ports). In another embodiment, a pipe manifold is provided comprising one inlet port and three outlet ports. In certain embodiments, the ports of a pipe manifold terminate in, or otherwise comprise, a male pipe thread, 0.75-14NPT. A channel or thruway for the pipe manifolds and related ports is contemplated as being between approximately 0.25 inches and approximately 1.50 inches in diameter. In preferred embodiments, the channel is provided comprising a diameter of approximately 0.6875 inches.

In one embodiment, a pipe manifold comprises a length of between approximately 18 inches and approximately 40 inches, and preferably of approximately 23.75 inches. The manifold comprises an inlet port and an outlet port, wherein the inlet port and the outlet port are collinear about a longitudinal axis of the manifold. An additional plurality of ports are orientated transversely to the length of the part, along a 1.50" thick surface. The first outlet port is located approximately 3.25 inches from an inlet end of the assembly, and the remaining transverse outlet ports are spaced approximately 5.00 inches apart thereafter.

In one embodiment, a pipe manifold comprises a length of between approximately 5.0 inches and approximately 20.0 inches, and preferably of approximately 11.75 inches. An inlet port and the final outlet port are preferably collinear and spaced apart by the length of the part. A remaining plurality of ports are orientated transversely to the length of the part, along a 1.50" thick surface. The ports are each preferably oriented substantially perpendicular to the inlet port and the outlet port. The first outlet port is located 3.375" from the inlet end of the assembly, and the remaining transverse outlet port is spaced 5.00" from the first.

In various embodiments, methods of resin infusion are contemplated. In certain embodiments, methods of resin infusion are performed that comprise the steps of: providing a manifold as shown and described herein, positioning the manifold in a desired position, attaching lines or conduits to each of the inlet, outlets, and/or ports of the manifold, opening an inlet to the manifold and allowing resin to flow into the manifold, opening resin infusion ports as needed or desired and allowing a vacuum force to extract resin from the manifold, and applying a heat blanket to a part (e.g. turbine blade) to bake the applied resin. In certain embodiments, manifolds of the present disclosure are provided as disposable components which may be used for as few as one resin infusion or application process. In some embodiments, the step of positioning the manifold comprises mounting the manifold to a fixture, such as a rack assembly disposed above or proximal to a workspace or workpiece.

In various embodiments, resin infusion manifolds of the present disclosure are provided as moveable or translatable components. Certain applications may require the movement of a resin application manifold as shown and described herein in order to evenly apply a resin or similar coating over a large area (e.g. during manufacture of large items such as ship hulls). Accordingly, embodiments of the present disclosure contemplate providing a manifold on a track and providing the manifold as a motor-driven unit that is controllable and moveable by a user in at a constant velocity over a given distance.

Although specific embodiments are disclosed herein, wherein manifolds comprise various specific dimensions, it will be recognized that the present disclosure is not limited to such dimensions or to manifolds of any particular dimension(s). Manifolds of the present disclosure may be scaled up or down and/or varied in proportion.

In some embodiments, manifolds of the present disclosure are contemplated as comprising hand-held items that may be manipulated by a user. Additionally, or alternatively, manifolds of the present disclosure may be mounted to an additional structure or frame member. Manifolds and manifold features, such as valves, may be connected to an electronic control unit to control features and operations of the manifold.

In certain embodiments, manifolds of the present disclosure comprise a plurality of ports, wherein at least some of the plurality of ports comprise a valve to allow flow control and to provide emergency shut off access should there be a failure somewhere in the system (for example). Valves for use with manifold ports of the present disclosure include, but are not limited to ball valves, gate valves, solenoid valves, globe valves, butterfly valves, and diaphragm valves. In certain embodiments, at least some valves comprise a 'quick connect' compression fitting attached to the valve in order to allow efficient installation of the required inlet and outlet hoses.

In various embodiments, at least one inlet hose and at least one outlet hose is connected to a manifold. The inlet and outlet hose(s) are affixed to compression fittings and preferably comprise spiral wire reinforced PVC transfer hose. At least one of an inlet hose and an outlet hose is connected to a reducer, which is affixed to a smaller diameter hose that leads directly to an infusion orifice.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular system embodiments illustrated herein.

DETAILED DESCRIPTION

FIGS. 1-5 depict a manifold 2 according to one embodiment of the present disclosure. The manifold 2 comprises a primary inlet 4 and a primary outlet 6 provided in opposing relationship and distributed by a length of the manifold. The manifold 2 comprises an elongate body portion 8 extending between the primary inlet 4 and the primary outlet 6. The elongate body portion 8 comprises a substantially rectangular cross-section as shown in FIGS. 1-5, but may comprise various other shapes. The manifold 2 of FIGS. 1-5 comprises four resin application outlets 10 distributed along a length of the manifold 2. As used herein, the terms "application", "infusion" and "injection" are used substantially interchangeably with respect to resin. One of ordinary skill in the art will recognize that the final delivery location of resin will be determined by the specific process and article of manufacture for which the device 2 is used.

Figure 1:
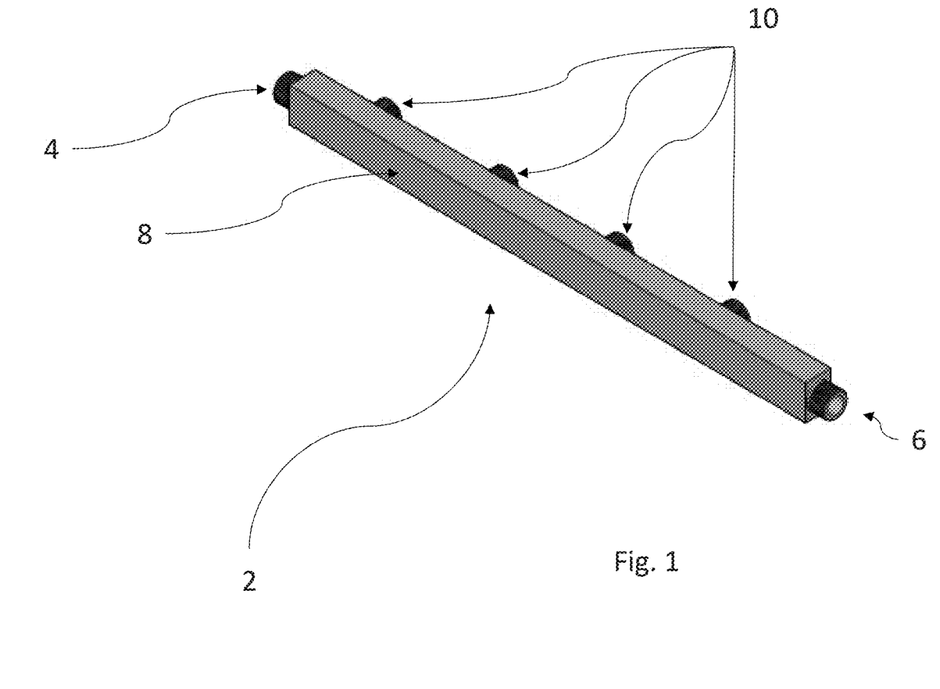
FIG. 1 is a perspective view of a manifold assembly for resin injection according to one embodiment of the present disclosure.
Figure 2:
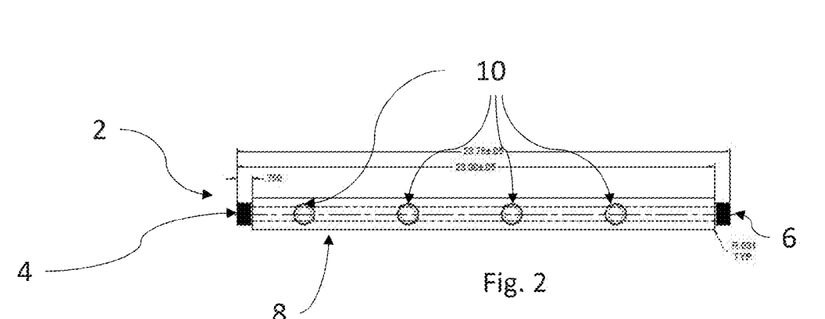
FIG. 2 is a bottom plan view of the manifold assembly according to the embodiment of FIG. 1.
Figure 3:
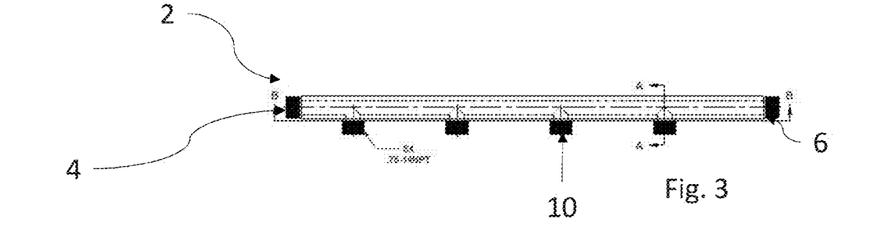
FIG. 3 is a front elevation view of the manifold assembly according to the embodiment of FIG. 1.
Figure 4:
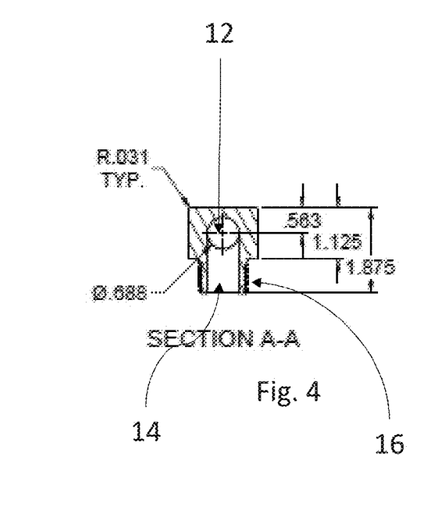
FIG. 4 is a section view taken at line A-A of FIG. 3.
Figure 5:
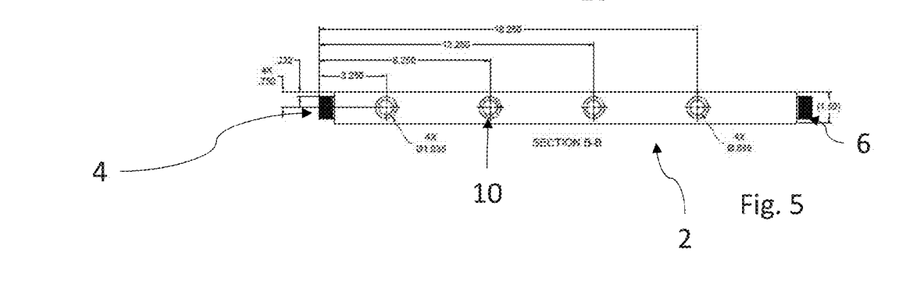
FIG. 5 is a dimensioned bottom plan view of the manifold assembly according to the embodiment of FIG. 1.
Figure 6:
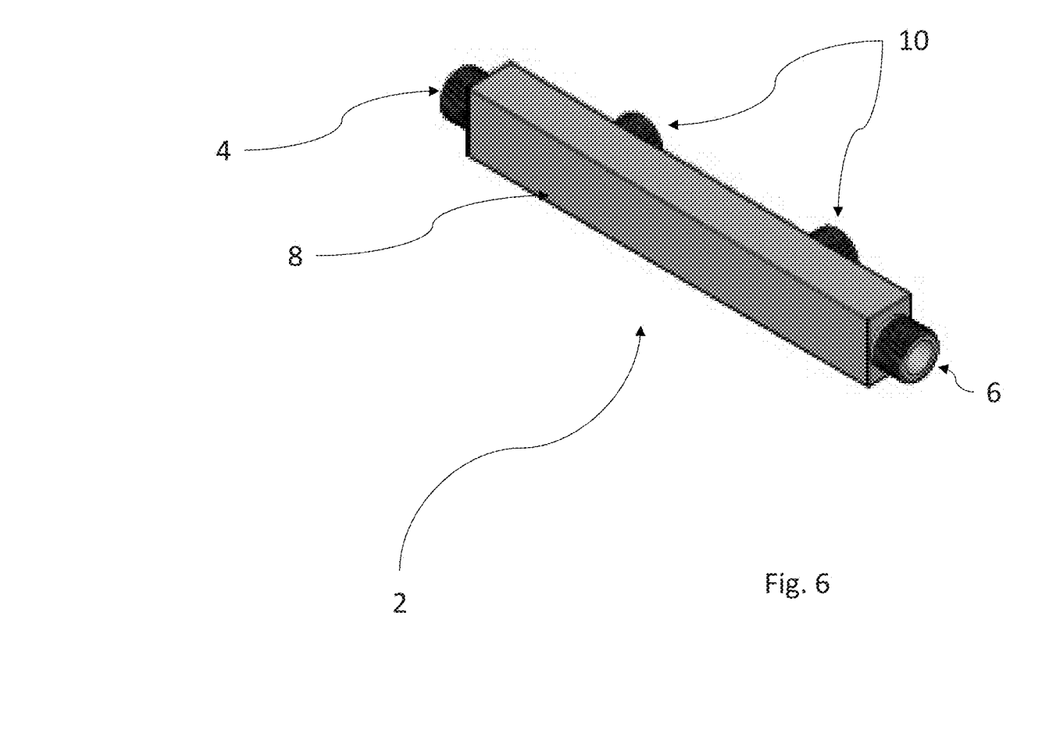
FIG. 6 is a perspective view of a manifold assembly for resin application or infusion according to one embodiment of the present disclosure.
Figure 7:
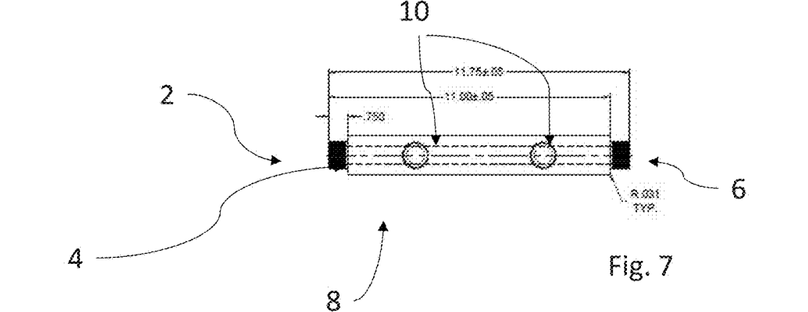
FIG. 7 is a bottom plan view of the manifold assembly according to the embodiment of FIG. 6.
Figure 8:
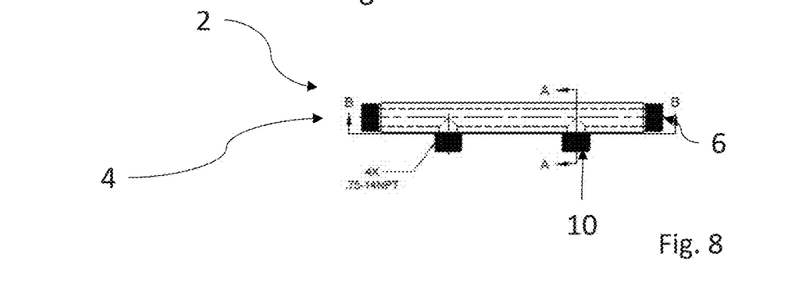
FIG. 8 is a front elevation view of the manifold assembly according to the embodiment of FIG. 6.
Figure 9:
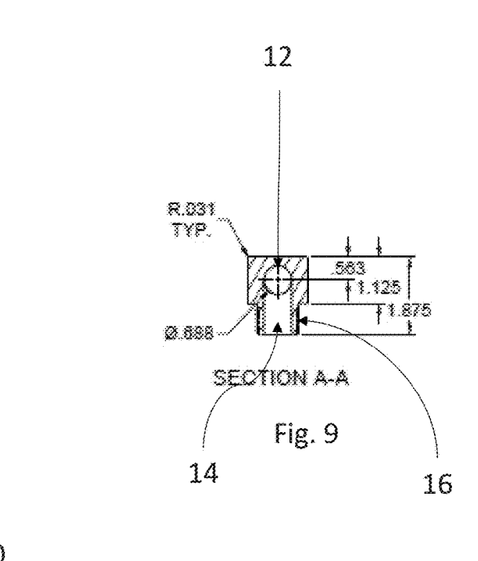
FIG. 9 is a section view taken at line A-A of FIG. 8.
Figure 10:
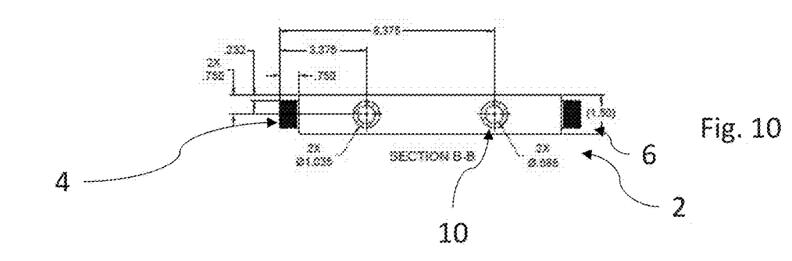
FIG. 10 is a dimensioned bottom plan view of the manifold assembly according to the embodiment of FIG. 9.

As shown in the cross-sectional view of FIG. 4, the manifold 2 comprises a major channel 12 and a plurality of minor channels 14 for ejecting resin or similar materials from the resin application outlets 10. An exterior portion 16 of the minor channels 14 preferably comprises male threaded members. Various Figs., including FIGS. 4-5, are provided with dimensions to illustrate manifolds of certain embodiments of the present disclosure. It will be recognized, however, that no limitation with respect to size, shape or proportions of the manifold(s) are provided herewith. It is contemplated that the size and proportions of the manifolds may be varied based on a described application or use in a specific process, for example.

FIGS. 6-10 depict a manifold 2 according to another embodiment of the present disclosure. The manifold 2 of FIGS. 6-10 generally comprises the same structure of the embodiment of FIGS. 1-5, but comprises two resin injection outlets 10. The numbering provided with FIGS. 1-5 is thus also used for FIGS. 6-10, with like numbers representing the same or similar components as shown and described herein.

In various embodiments, a manifold 2 of the present disclosure comprises at least one valve. In certain embodiments, a valve is provided in association with each of the resin application outlets 10. A user-interface, such as a valve handle, may be provided on an upper portion or side portion of the elongate body portion.

The manifolds 2 of FIGS. 1-10 are shown and described as comprising a primary inlet 4 and a primary outlet 6. It is contemplated, however, that the primary outlet 6 may also operate as an inlet for resin and similar material. Similarly, the primary inlet 4 may operate as an outlet for resin.

Figure 11:
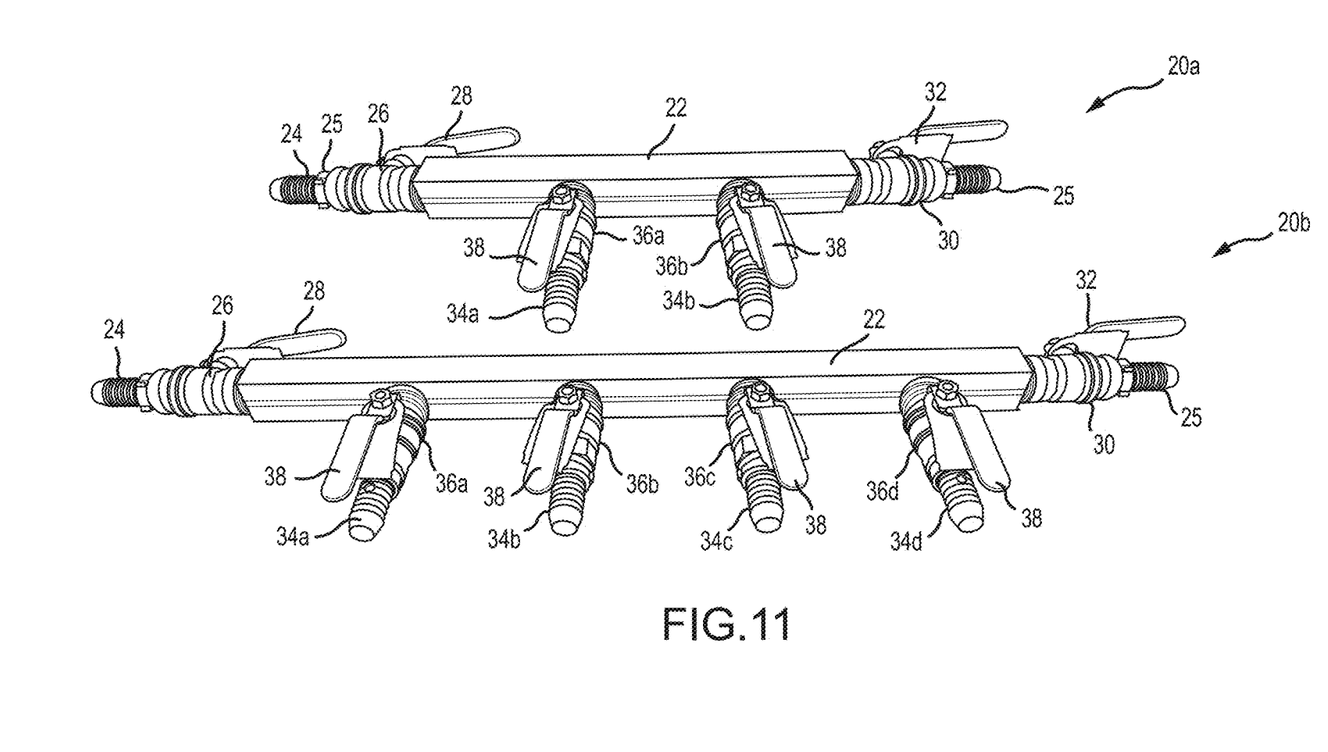
FIG. 11 is a perspective view of manifold assemblies according to embodiments of the present disclosure.

FIG. 11 is a perspective view of manifolds 20a, 20b according to embodiments of the present disclosure. As shown, each of the manifolds 20a, 20b comprises a primary inlet 24, a primary outlet 25, and a plurality of resin application outlets 34. The first manifold 20a comprises two application outlets 34a, 34b. The second manifold 20b comprises four application outlets 34a, 34b, 34c, 34d. The first and second manifolds comprise elongate body portions 22 having different lengths to accommodate the different number of application outlets.

As shown in FIG. 11, each of the primary inlet 24, the primary outlet 30, and the injection outlets 34a, 34b, 34c, 34d comprise a user-operable valve 36. The valve(s) 36 may comprise various different types of valves, including manual valves, solenoid valves, and other valves. For example, the valves 36 of FIG. 11 may comprise any one or more of a ball valve, a globe valve, a butterfly valve, a gate valve, and a diaphragm valve, for example. In preferred embodiments, each of the valves 26, 30, 36 comprises a handle 28, 32, 38 that are operable to selectively control a fluid or resin flow through the respective outlet. FIG. 11 depicts hand-operated devices according to embodiments of the present disclosure. Alternative embodiments contemplate the provision of valves that may be remotely controlled, such as one or more solenoid valves that are operable to be controlled by a circuit and a remote switch, for example. Such embodiments are particularly well suited for applications where it is undesirable, unsafe, or impossible for a user to manually operate valves.

Figure 12:
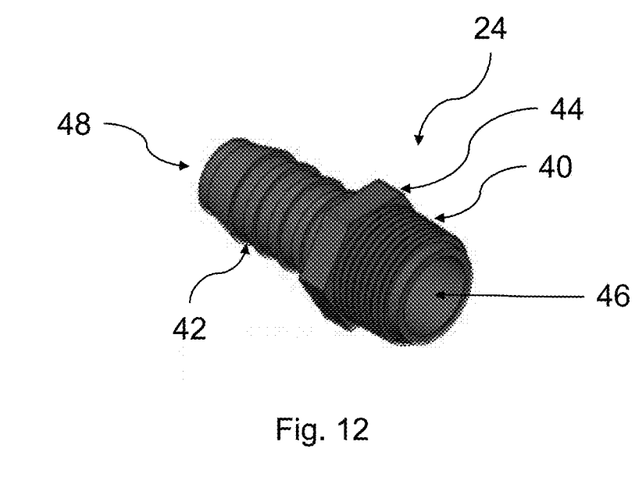
FIG. 12 is a perspective view of a component of a resin infusion system according to one embodiment of the present disclosure.

As shown in FIG. 11, the outlets 24, 25, 34 comprise a nipple or fitting in fluid communication with a valve and an internal flow path of the elongate body portion 22. An inlet or outlet fitting 24 contemplated for use with embodiments of the present disclosure is further shown in FIG. 12. As shown in FIG. 12, the fitting 24 comprises a threaded portion 40 that is operable to be secured or connected to a valve (for example). The fitting 24 further comprises a rasped or toothed portion 42 that is operable to receive and secure a hose or piping (for example). A collar 44 is provided that is operable to receive a wrench to tighten or loosen the fitting. An inlet 46 and an outlet 48 are provided on opposing ends of the fitting 24. The fitting 24 may be provided at any one or more of the primary inlet 24, the primary outlet 25, and the injection outlets 34 of FIG. 12. Fittings of the present disclosure are contemplated as comprising polyvinyl chloride, but may be formed of various materials of sufficient durability and heat resistance for resin injection molding operations.

Although various Figures comprise dimensions, it will be expressly recognized that these dimensions are provided to illustrate certain embodiments and no limitations with respect to these dimensions are provided herewith. It is contemplated that manifolds of the present disclosure, including those shown in the Figures may be scaled up or down, and/or may be varied in proportion.

While various embodiments of the system have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as, additional items.

What is claimed is:

1. A resin application manifold comprising:
   an elongate body portion comprising a length and having a first end and a second end, and wherein the elongate body portion at least partially defines a fluid flow path;
   an inlet provided at the first end of the elongate body portion;
   a first outlet provided at the second end of the elongate body portion;
   at least one resin application outlet provided along the length of the elongate body portion at a point between the inlet and the first outlet;
   wherein each of the inlet, the first outlet, and the resin application outlet comprise a valve for selectively dispensing a resin through the at least one of the plurality of resin application outlet.

2. The resin application manifold of claim 1, wherein the valves comprise ball valves.

3. The resin application manifold of claim 1, wherein the manifold comprises a plurality of resin application outlets.

4. The resin application manifold of claim 1, wherein the resin application outlet comprises a fitting with an inlet and an outlet and wherein the fitting is operable to receive at least one of a rubber hose and a pipe.

5. The resin application manifold of claim 1, wherein the fluid flow path comprises an interior channel with an internal diameter of between approximately 0.25 inches and approximately 1.50 inches.

6. The resin application manifold of claim 5, wherein the interior channel extends between the inlet, the first outlet, and the at least one resin application outlet.

7. The resin application manifold of claim 5, Wherein the body portion comprises aluminum.

8. A resin application manifold comprising:
   a body portion comprising a length and having a first end and a second end, and wherein the body portion at least partially defines a fluid flow path;
   an inlet provided at the first end of the elongate body portion;
   a first outlet provided at the second end of the elongate body portion;
   at least one resin application outlet provided on the elongate body portion at a point between the inlet and the first outlet;
   wherein each of the inlet, the first outlet, and the resin application outlet comprise a valve for selectively dispensing a resin through the at least one of the plurality of resin application outlet.

9. The resin application manifold of claim 8, wherein the valves comprise at least one of a ball valve, a globe valve, a gate valve, a solenoid valve, and a diaphragm valve.

10. The resin application manifold of claim 8, wherein the manifold comprises a plurality of resin application outlets.

11. The resin application manifold of claim 10, wherein each of the resin application outlets comprises a valve.

12. The resin application manifold of claim 8, wherein the resin application outlet comprises a fitting with an inlet and an outlet and wherein the fitting is operable to receive at least one of a rubber hose and a pipe.

13. The resin application manifold of claim 8, wherein the fluid flow path comprises an interior channel having an internal diameter of between approximately 0.25 inches and approximately 1.50 inches.

\* \* \* \* \*